No. 895,887. PATENTED AUG. 11, 1908.
J. E. NOEGGERATH.
ACYCLIC MACHINE.
APPLICATION FILED JAN. 16, 1906.
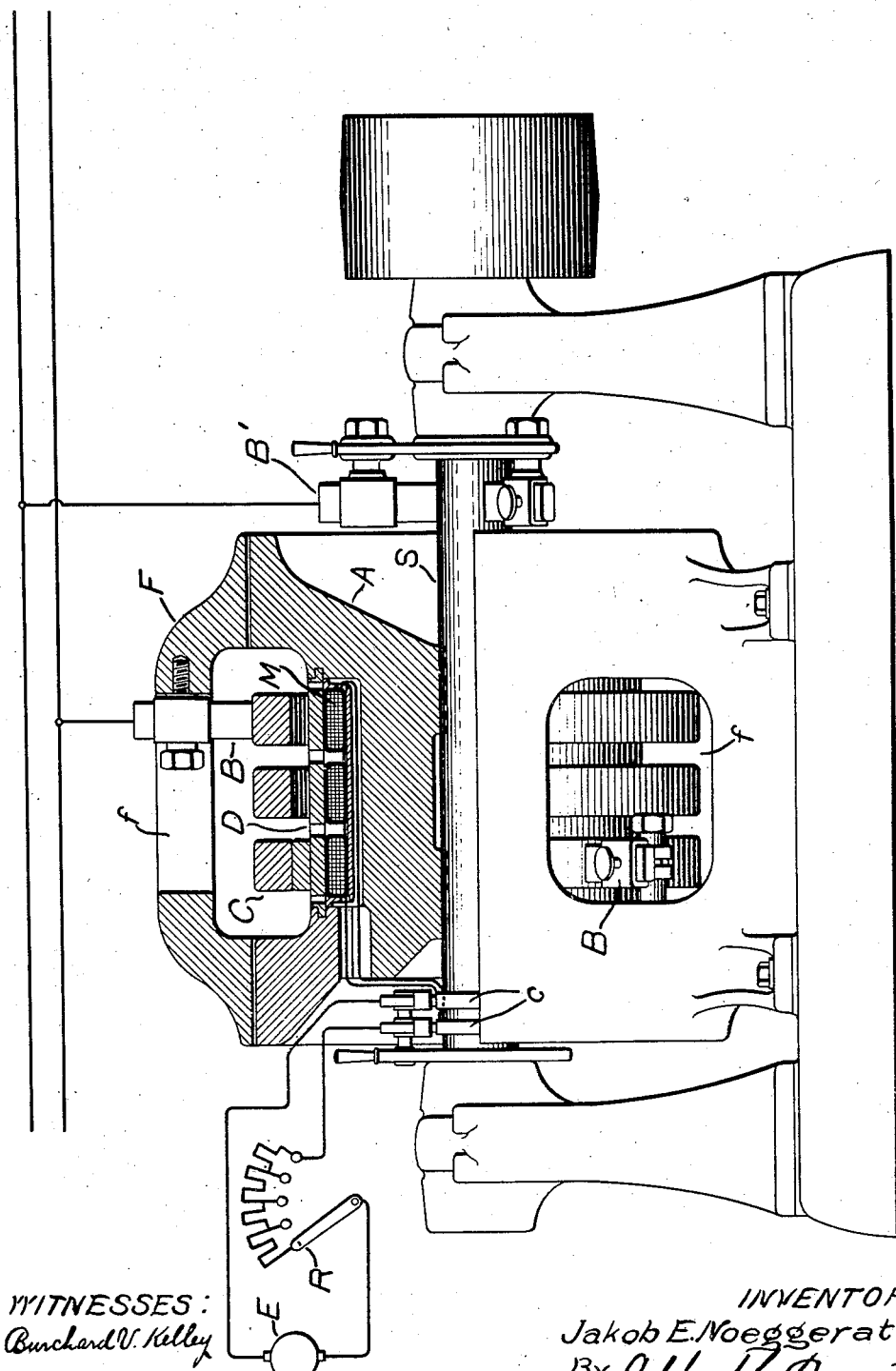
WITNESSES:
Burchard V. Kelley
Arlue Osford
INVENTOR
Jakob E. Noeggerath,
By Albert G. Davis
Att'y.

UNITED STATES PATENT OFFICE.

JAKOB E. NOEGGERATH, OF SCHENECTADY, NEW YORK, ASSIGNOR TO GENERAL ELECTRIC COMPANY, A CORPORATION OF NEW YORK.

ACYCLIC MACHINE.

No. 895,887.   Specification of Letters Patent.   Patented Aug. 11, 1908.

Application filed January 16, 1906. Serial No. 296,411.

*To all whom it may concern:*

Be it known that I, JAKOB E. NOEGGERATH, a citizen of the United States, residing at Schenectady, in the county of Schenectady, State of New York, have invented certain new and useful Improvements in Acyclic Machines, of which the following is a specification.

My invention relates to dynamo-electric machines of the acyclic type, and its object is to provide a novel construction for such machines which is more efficient and simpler than the constructions heretofore employed.

Acyclic machines, as ordinarily constructed, comprise a stationary homopolar field structure provided with a magnetizing winding, and a revolving armature with or without armature conductors. The field winding is frequently and conveniently arranged in the form of a coil or coils carried by the field structure concentric with the armature.

My invention consists of an acyclic machine possessing certain novel features, which will be definitely pointed out in the appended claims.

My invention will best be understood by reference to the accompanying drawing, which shows a side elevation partly in cross-section of an acyclic machine arranged in accordance with my invention.

In this drawing A represents the revolving armature carried on a suitable shaft S. The armature is substantially cylindrical in form with enlarged flanges at the end, and carries at its center between the end-flanges the magnetizing winding M formed of coils wound around and supported on the periphery of the armature and insulated therefrom. The armature may be slotted as shown in the drawing to receive the terminal leads for these coils. These coils are held in place against centrifugal strain by a metallic shell D, which is either in whole or in part of non-magnetic material so as to have a high reluctance, and is provided with ventilating holes, as shown. F represents the field magnet which is arranged to present homopolar faces to both ends of the armature. The field flux may be considered as passing from one end-flange of the armature, across the air-gap, into the field structure F, across the field the other homopolar face across the second air-gap and through the armature flange at that end. The field structure F is provided with the usual openings *f*, to give access to the brushes. The field flux is stationary in space, as in the usual construction. Consequently, as the armature rotates, cutting this flux, a difference of potential will be induced between the armature shaft and the armature periphery between the end-flanges. Consequently, by means of collector rings C supported outside of the shell D and electrically-connected thereby with the periphery of the armature and the brushes B forming one terminal, and the brushes B' bearing on the shaft and forming the other terminal, a current may be led off from the machine. The armature is shown arranged for low-voltage, without separate conductors, the armature body itself forming the seat of the induced currents which are supplied to load-circuit. It will be seen that the collector rings C serve not only as means for collecting current, but also to strengthen the shell D.

Since the machine is shown as a low-voltage machine it is also shown as separately excited. The terminals of the field winding M are connected to collector rings *c* to which the exciting current is supplied by a small exciter E.

R represents the field rheostat.

What I claim as new and desire to secure by Letters Patent of the United States, is,—

1. In a dynamo-electric machine, a revolving armature, a stationary homopolar field structure, having poles each extending uniformly around the armature, a magnetizing winding surrounding and carried by the armature, a non-magnetic shell surrounding said winding and restraining it against centrifugal force, and collector rings carried by said shell.

2. In a dynamo-electric machine, a revolving cylindrical armature, a magnetizing winding surrounding and carried by the central portion of the armature, a stationary field structure presenting to both ends of the armature homopolar faces each extending uniformly around the armature, a non-magnetic shell surrounding the magnetizing winding and restraining it against centrifugal force, and collector rings carried by said shell.

3. In a dynamo-electric machine, a revolving cylindrical armature having enlarged flanges at its ends, a magnetizing winding surrounding and carried by the armature between said flanges, a field structure adapted to present homopolar faces to said flanges, current collecting means engaging the armature between said flanges, and current-collecting means engaging the armature outside of said flanges.

4. In a dynamo-electric machine, a revolving cylindrical armature having enlarged flanges at its ends, a magnetizing winding surrounding and carried by the armature between said flanges, a shell of high reluctance surrounding said winding and restraining it against centrifugal force, a field structure adapted to present homopolar faces to said flanges, current-collecting means engaging said armature between said flanges, and current-collecting means engaging the armature outside of said flanges.

In witness whereof, I have hereunto set my hand this 15th day of January, 1906.

JAKOB E. NOEGGERATH.

Witnesses:
HELEN ORFORD,
G. C. HOLLISTER.